Patented Jan. 11, 1938

2,104,738

UNITED STATES PATENT OFFICE 2,104,738

BISMUTH ALLANTOINATE AND PROCESS OF MAKING IT

William H. Engels, Rahway, and Gustav A. Stein, Elizabeth, N. J., assignors to Merck & Co. Inc., Rahway, N. J., a corporation of New Jersey No Drawing. Application December 18, 1936, Serial No. 116,646

4 Claims. (Cl. 260—11)

This invention relates to bismuth allantoinate, and to process for its production.

It has been pointed out that allantoin, the diureide of glyoxylic acid, is found in maggot excretions, (Robinson, J. Parasitology, 21, p. 354, October, 1935), and is probably the active principle which is responsible for the success of maggot therapy for infested wounds, ulcers, etc.

Allantoin has been heretofore employed for this purpose, the allantoin treatment being usually effected by applying gauze dressings saturated with an aqueous solution of allantoin to the affected areas. This mode of treatment has the disadvantage, however, that the dressings have to be replaced when dry, thus requiring frequent attention. Furthermore, it has been observed that free allantoin, especially in high concentrations is irritating in certain cases.

In view of these disadvantages of the known method of applying allantoin, it was understood that if allantoin were produced in a form which would not cause irritation, and which would be applied in a manner which would require less attention, this would constitute a distinct advance over the art. Such a form of allantoin treatment would be especially desirable, because the type of wound to which allantoin is generally applied heals comparatively slowly.

It was, therefore, conceived by the present inventors to prepare allantoin in the form of a compound which, while itself relatively insoluble, would dissociate in the presence of wound serum and slowly release the allantoin. Thus, prolonged effective contact of the allantoin with the affected areas would be assured.

The object of the present invention, therefore, is to produce a powder, relatively insoluble in water, which will gradually give off allantoin when dusted on external wounds, lesions, ulcers, etc., or when administered per os for the treatment of internal lesions.

We have now prepared a hitherto unknown compound, bismuth allantoinate, and have found it highly suitable for the intended purposes as it is a rather insoluble compound and gradually decomposes on contact with water or wound serum into its components, bismuth hydroxide and allantoin.

Bismuth hydroxide, itself, exerts a curative effect upon wounds, ulcers, etc. Therefore this relatively insoluble material, when combined with the highly active allantoin, reinforces the healing properties of the latter, through its own beneficial action and this compound at the same time, through slow decomposition in the presence of wound serum, causes the allantoin to be gradually released to the affected parts, thus insuring prolonged contact of the allantoin with the area being treated, and thus also avoiding irritation which might otherwise occur if the allantoin were applied in the uncombined form.

In general, our process of preparing this new compound comprises adding a bismuth salt, such as the nitrate, for example, to an aqueous solution of allantoin whereby bismuth allantoinate is obtained. This new compound has the approximate composition represented by the following formula:

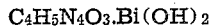

$$C_4H_5N_4O_3.Bi(OH)_2$$

The following example of the detailed steps of the process is illustrative, only, and it will be understood that various modifications may be made therein without departing from the spirit and scope of the invention or appended claims. Thus, for instance, those skilled in the art will readily understand that other salts of bismuth will be valid for the process, in addition to the nitrate specifically exemplified. Also, other acids may be used in the preparation of the solution of bismuth nitrate, such as acetic acid, for example, and other alkalis may be used for neutralizing the free acid, as, for instance potassium hydroxide or ammonia.

Example

About 199 gms. of allantoin are suspended in 2525 cc. of water, and dissolved in the cold by the addition of 1269 cc. of normal sodium hydroxide. A cold solution of 612 gms. of bismuth nitrate in 505 cc. of nitric acid (10%) is added with stirring. After stirring the mixture vigorously for a short time, about 2500 cc. of normal sodium hydroxide is added within a minute or two, and, finally, the pH value is adjusted to about 7 by the further addition of about 300 cc. more of normal sodium hydroxide solution. The mixture is stirred for 5 hours, during which time it is essential to keep the pH at 7, in order to avoid dissociation of the compound formed. The bismuth allantoinate is filtered, washed on the filter with about 100 cc. of ice water, and dried.

The product is a fine powder which is of white or light yellow color. It contains only a slight amount of free allantoin, and shows a $Bi_2O_3$ content of approximately 58.1%.

We claim as our invention:

1. As a new product suitable for therapeutic purposes, bismuth allantoinate.

2. A process for the preparation of bismuth allantoinate which comprises essentially adding a solution of a bismuth salt to a solution of allantoin and adjusting the pH value to 7.

3. A process for the preparation of bismuth allantoinate which comprises essentially adding a solution of bismuth nitrate in a dilute acid to an aqueous solution of allantoin, and adjusting the pH value to 7.

4. A process for the preparation of bismuth allantoinate which comprises the steps of dissolving allantoin in cold water with the aid of alkali, adding bismuth nitrate in acid solution, stirring, adding alkali, adjusting the pH to 7 by the addition of further alkali, stirring the mixture for about 5 hours, filtering the formed bismuth allantoinate, washing and drying.

WILLIAM H. ENGELS.
GUSTAV A. STEIN.